United States Patent
Molloy et al.

(10) Patent No.: US 10,901,806 B2
(45) Date of Patent: Jan. 26, 2021

(54) INTERNET OF THINGS RESOURCE OPTIMIZATION

(71) Applicant: International Business Machines Corporation, Armonk, NY (US)

(72) Inventors: Christopher L. Molloy, Raleigh, NC (US); Robert S. Milligan, Erlanger, KY (US); Gordan G. Greenlee, Endicott, NY (US); Steven A. Waite, Racine, WI (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 15/967,737

(22) Filed: May 1, 2018

(65) Prior Publication Data
US 2019/0340038 A1     Nov. 7, 2019

(51) Int. Cl.
*G06F 9/50* (2006.01)
*G06F 9/48* (2006.01)
(Continued)

(52) U.S. Cl.
CPC .......... *G06F 9/5088* (2013.01); *G06F 9/4881* (2013.01); *G06F 2209/508* (2013.01);
(Continued)

(58) Field of Classification Search
CPC ............... G06F 9/4881; G06F 9/5088; G06F 2209/508; G06F 2209/5019; H04L 12/4641; H04L 67/12
(Continued)

(56) References Cited

U.S. PATENT DOCUMENTS

| 6,026,425 A | 2/2000 | Suguri et al. |
| 6,636,860 B2 | 10/2003 | Vishnubhotla |

(Continued)

FOREIGN PATENT DOCUMENTS

| CN | 206002870 U | 3/2017 |
| CN | 106936892 A | 7/2017 |

(Continued)

OTHER PUBLICATIONS

Chao Chen et al., "The User Side of Sustainability: Modeling Behavior and Energy Usage in the Home", Oct. 24, 2012, 28 pages.
(Continued)

*Primary Examiner* — Ryan D. Coyer
(74) *Attorney, Agent, or Firm* — Nicholas D. Bowman; Madeline F. Schiesser; Keohane & D'Alessandro, PLLC (57) ABSTRACT

Approaches presented herein enable optimization of a plurality of resources connected within an Internet of Things (IoT) network. More specifically, usage of a first and a second resource of the plurality of resources connected within the IoT network is tracked. This usage comprises a task and a time at which the task is performed for each of the two resources. An anticipated task at an anticipated time based on the tracked usage of the first resource is identified. An anticipated capacity at substantially the same anticipated time is also identified on the second resource based on the tracked usage of the second resource. Excess capacity is generated on the first resource by transferring the anticipated first task to the second resource for the anticipated time. The excess capacity is designated for use by an arm's-length party. A load from the arm's-length party is then assigned to the excess capacity.

20 Claims, 6 Drawing Sheets

(51) Int. Cl.
*H04L 12/46* (2006.01)
*H04L 29/08* (2006.01)

(52) U.S. Cl.
CPC .. *G06F 2209/5019* (2013.01); *H04L 12/4641* (2013.01); *H04L 67/12* (2013.01)

(58) Field of Classification Search
USPC ........................................................ 718/104
See application file for complete search history.

(56) References Cited

U.S. PATENT DOCUMENTS

| | | | |
|---|---|---|---|
| 7,113,939 B2 | 9/2006 | Chou et al. | |
| 7,236,973 B2 | 6/2007 | Kalthoff et al. | |
| 7,263,496 B1 | 8/2007 | Weigelt et al. | |
| 8,104,041 B2* | 1/2012 | Belady | G06F 11/3409 |
| | | | 709/226 |
| 8,924,982 B2* | 12/2014 | Brandwine | G06F 9/5072 |
| | | | 718/104 |
| 9,747,121 B2 | 8/2017 | Kelly et al. | |
| 10,452,605 B2* | 10/2019 | Wang | G06F 9/48 |
| 2002/0087613 A1* | 7/2002 | Harif | G06Q 30/02 |
| | | | 718/104 |
| 2005/0076339 A1* | 4/2005 | Merril | H04L 47/722 |
| | | | 718/104 |
| 2007/0240161 A1 | 10/2007 | Prabhakar et al. | |
| 2010/0057625 A1* | 3/2010 | Boss | G06Q 30/08 |
| | | | 705/80 |
| 2011/0161973 A1* | 6/2011 | Klots | H04L 47/805 |
| | | | 718/104 |
| 2012/0131591 A1* | 5/2012 | Moorthi | G06Q 10/06 |
| | | | 718/104 |
| 2013/0007760 A1* | 1/2013 | O'Sullivan | G06Q 10/00 |
| | | | 718/104 |
| 2014/0109103 A1* | 4/2014 | Proffit | G06F 9/505 |
| | | | 718/104 |
| 2015/0134727 A1 | 5/2015 | Lee et al. | |
| 2016/0299550 A1* | 10/2016 | Wei | G06F 9/5022 |
| 2017/0192402 A1 | 7/2017 | Karp et al. | |
| 2017/0277654 A1* | 9/2017 | Wang | G06F 9/4843 |
| 2017/0359193 A1 | 12/2017 | Smith et al. | |
| 2018/0376531 A1 | 12/2018 | Martinez Tarradell et al. | |
| 2019/0288919 A1* | 9/2019 | Godor | H04L 47/827 |

FOREIGN PATENT DOCUMENTS

| | | |
|---|---|---|
| DE | 69725791 T2 | 11/2004 |
| WO | 2017/123417 A1 | 7/2017 |
| WO | 2018/020306 A1 | 2/2018 |

OTHER PUBLICATIONS

S.D.T. Kelly et al., "Towards the Implementation of IoT for Environmental Condition Monitoring in Homes", Copyright 2013 IEEE, 8 pages.
Anan Chen, PCT Notification of Transmittal of the International Search Report and Written Opinion, Jul. 31, 2019, 9 pages.

* cited by examiner

INTERNET OF THINGS RESOURCE OPTIMIZATION

TECHNICAL FIELD

The present invention relates generally to internet of things (IoT) devices and, more specifically, to optimizing usage of resources among a plurality of devices in an internet of things environment.

BACKGROUND

Smart devices and other devices linked in an Internet of Things (IoT) network are increasingly being installed in homes. The IoT network formed by these devices is generally a network that combines physical electronic devices with software, enabling these devices to form a connective network among themselves for the exchange of data. Each IoT device can be recognized as a separate computing system, but can also operate within the infrastructure of the IoT network. Some IoT devices may also have, for example, sensors for monitoring or actuators for performing tasks in the physical world. More specifically, the term "things" in IoT can refer to any of a wide variety of devices, from "smart" thermostats to complex biological monitoring equipment. IoT devices and the IoT network formed therefrom can offer, among other things, a combination of hardware, software, data generation, and service performance that integrate computer systems into the physical world. This can permit a minimization of human intervention in areas traditionally requiring such, as well as greater efficiency and accuracy of systems under the control of one or more devices in an IoT environment.

SUMMARY

Approaches presented herein enable optimization of a plurality of resources connected within an Internet of Things (IoT) network. More specifically, usage of a first and a second resource of the plurality of resources connected within the IoT network is tracked. This usage comprises a task and a time at which the task is performed for each of the two resources. An anticipated task at an anticipated time based on the tracked usage of the first resource is identified. An anticipated capacity at substantially the same anticipated time is also identified on the second resource based on the tracked usage of the second resource. Excess capacity is generated on the first resource by transferring the anticipated first task to the second resource for the anticipated time. The excess capacity is designated for use by an arm's-length party. A load from the arm's-length party is then assigned to the excess capacity.

One aspect of the present invention includes a method for optimizing a plurality of resources connected within an Internet of Things (IoT) network, the method comprising: tracking usage of a first resource and usage of a second resource of the plurality of resources connected within the IoT network, the usage of the first resource comprising a first task and a time at which the first task is performed and the usage of the second resource comprising a second task and a time at which the second task is performed; identifying an anticipated first task at an anticipated time based on the tracked usage of the first resource and identifying an anticipated capacity at substantially the same anticipated time on the second resource based on the tracked usage of the second resource; generating excess capacity on the first resource by transferring the anticipated first task to the second resource for the anticipated time; designating the excess capacity of the first resource at the anticipated time for use by an arm's-length party; and assigning a load from the arm's-length party to the excess capacity of the first resource.

Another aspect of the present invention includes a computer system for optimizing a plurality of resources connected within an Internet of Things (IoT) network, the computer system comprising: a memory medium comprising program instructions; a bus coupled to the memory medium; and a processor, for executing the program instructions, coupled to an IoT resource optimization engine via the bus that when executing the program instructions causes the system to: track usage of a first resource and usage of a second resource of the plurality of resources connected within the IoT network, the usage of the first resource comprising a first task and a time at which the first task is performed and the usage of the second resource comprising a second task and a time at which the second task is performed; identify an anticipated first task at an anticipated time based on the tracked usage of the first resource and identify an anticipated capacity at substantially the same anticipated time on the second resource based on the tracked usage of the second resource; generate excess capacity on the first resource by transferring the anticipated first task to the second resource for the anticipated time; designate the excess capacity of the first resource at the anticipated time for use by an arm's-length party; and assign a load from the arm's-length party to the excess capacity of the first resource.

Yet another aspect of the present invention includes a computer program product for optimizing a plurality of resources connected within an Internet of Things (IoT) network, the computer program product comprising a computer readable hardware storage device, and program instructions stored on the computer readable hardware storage device, to: track usage of a first resource and usage of a second resource of the plurality of resources connected within the IoT network, the usage of the first resource comprising a first task and a time at which the first task is performed and the usage of the second resource comprising a second task and a time at which the second task is performed; identify an anticipated first task at an anticipated time based on the tracked usage of the first resource and identify an anticipated capacity at substantially the same anticipated time on the second resource based on the tracked usage of the second resource; generate excess capacity on the first resource by transferring the anticipated first task to the second resource for the anticipated time; designate the excess capacity of the first resource at the anticipated time for use by an arm's-length party; and assign a load from the arm's-length party to the excess capacity of the first resource.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for optimization of a plurality of resources connected within an Internet of Things (IoT) network. More specifically, usage of a first and a second resource of the plurality of resources connected within the IoT network is tracked. This usage comprises a task and a time at which the task is performed for each of the two resources. An anticipated task at an anticipated time based on the tracked usage of the first resource is identified. An anticipated capacity at substantially the same anticipated time is also identified on the second resource based on the tracked usage of the second resource. Excess capacity is generated on the first resource by transferring the anticipated first task to the second resource for the anticipated time. The excess capacity is designated for use by an arm's-length party. A load from the arm's-length party is then assigned to the excess capacity.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
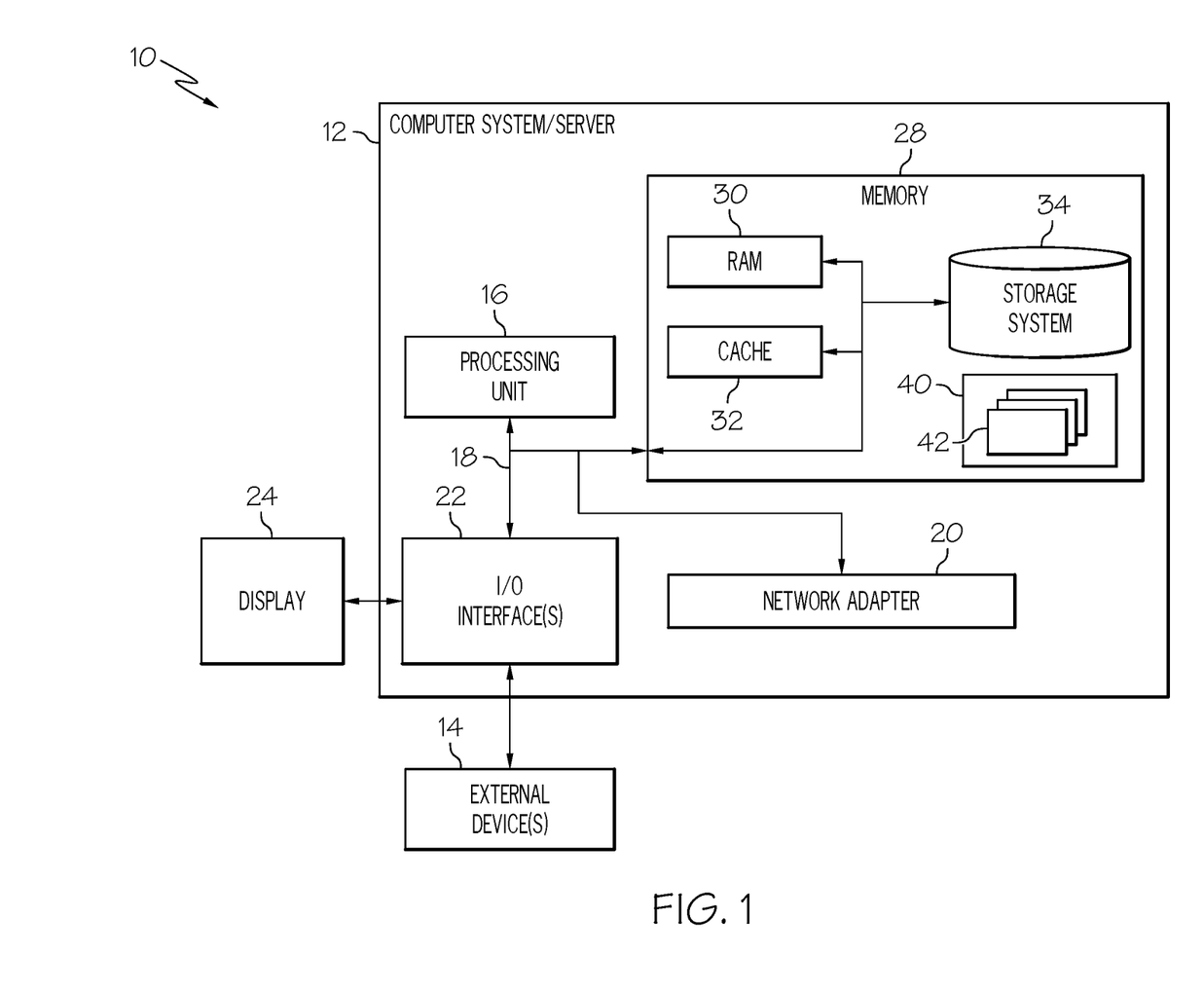
FIG. 1 shows an architecture in which the invention may be implemented according to illustrative embodiments.

Referring now to FIG. 1, a schematic of an example of a cloud computing node for optimizing a plurality of resources connected within an IoT network is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Further, referring to FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for optimizing a plurality of resources connected within an IoT network, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
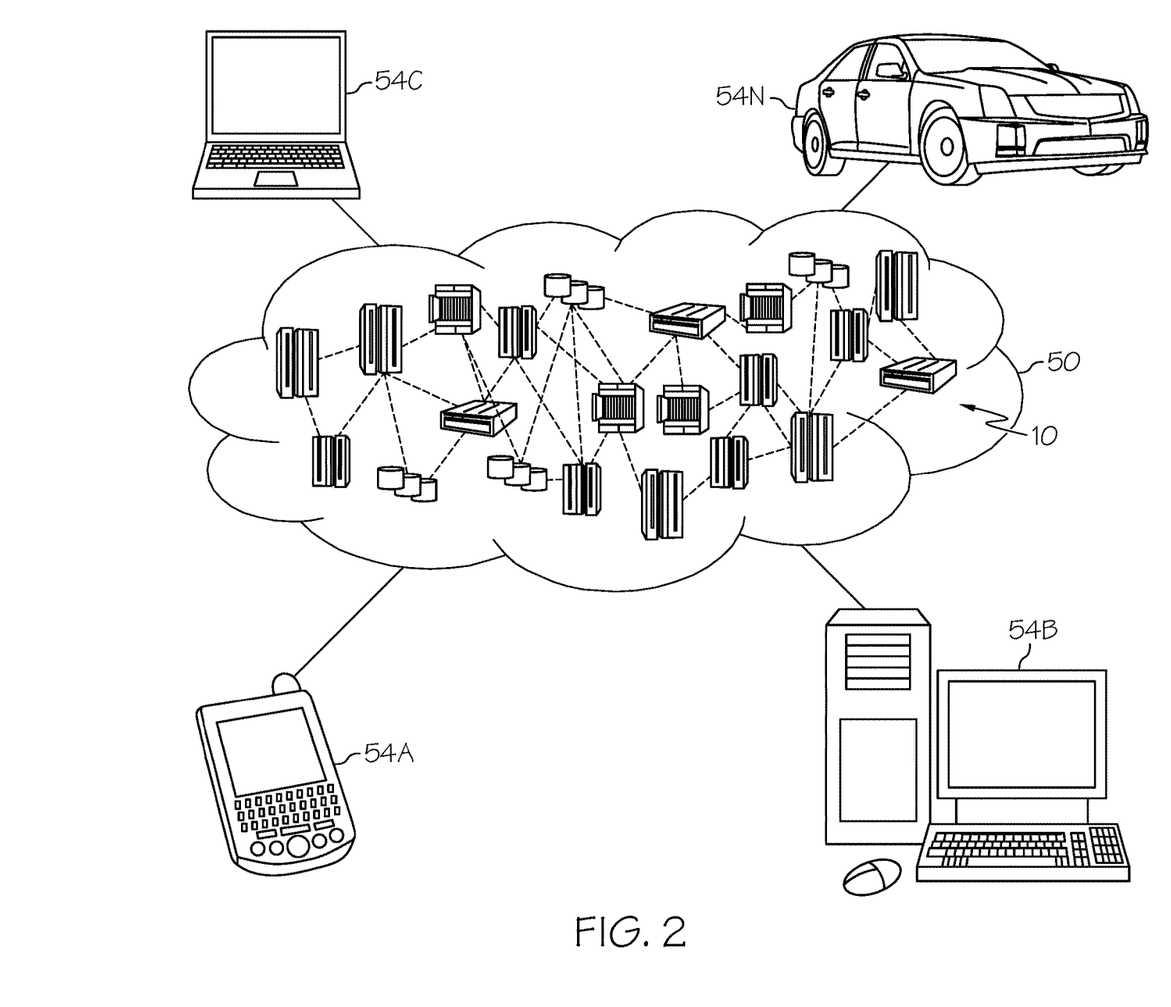
FIG. 2 depicts a cloud computing environment according to illustrative embodiments of the present invention.

Referring now to FIG. 2, illustrative cloud computing environment 50 is depicted. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
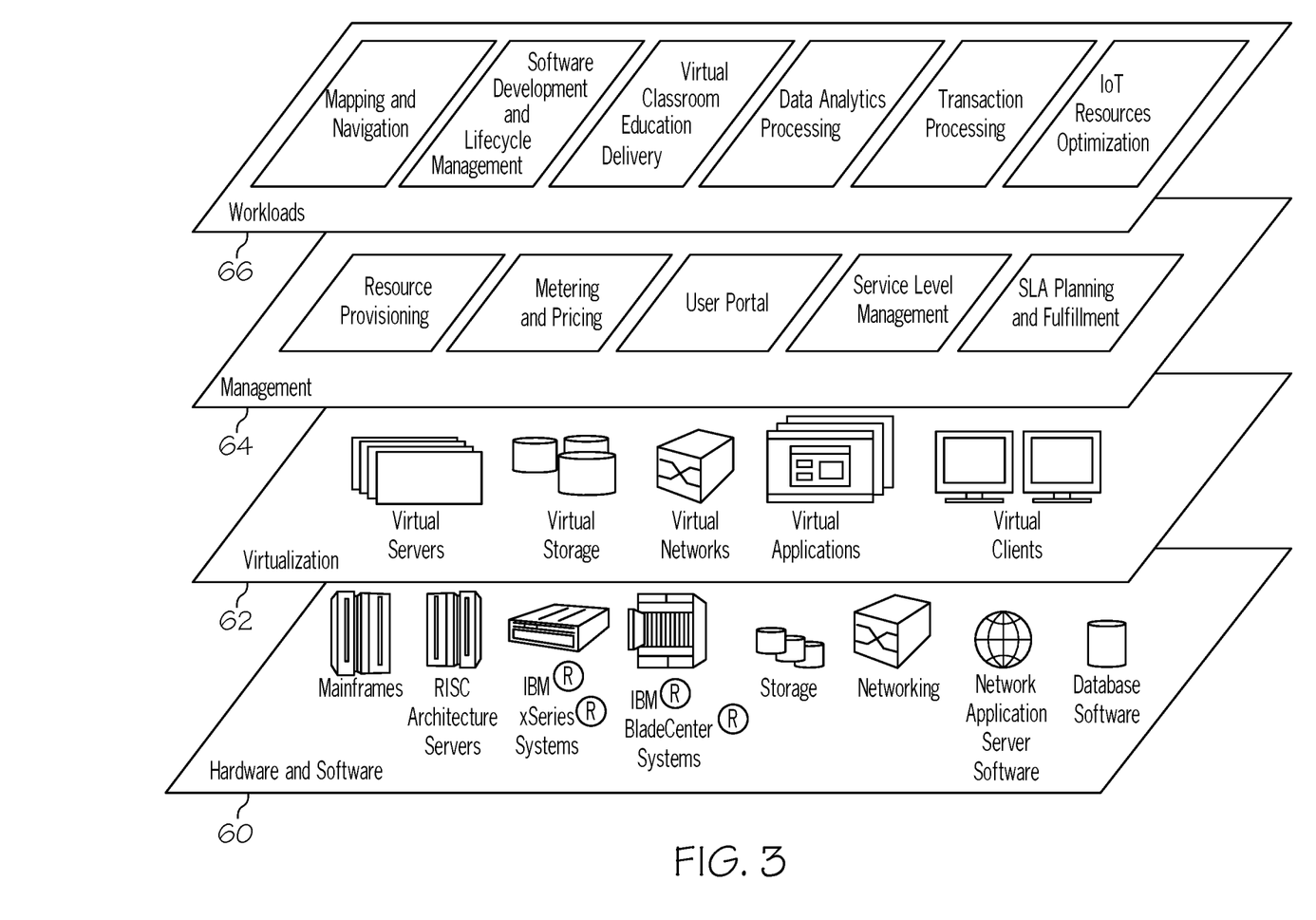
FIG. 3 depicts abstraction model layers according to illustrative embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and IoT resources optimization. As mentioned above, all of the foregoing examples described with respect to FIG. 3 are illustrative only, and the invention is not limited to these examples.

It is understood that all functions of the present invention as described herein typically may be performed by the IoT resources optimization functionality (of workload layer 66, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, some embodiments of the present invention are intended to be implemented with any type of networked computing environment now known or later developed.

Figure 4:
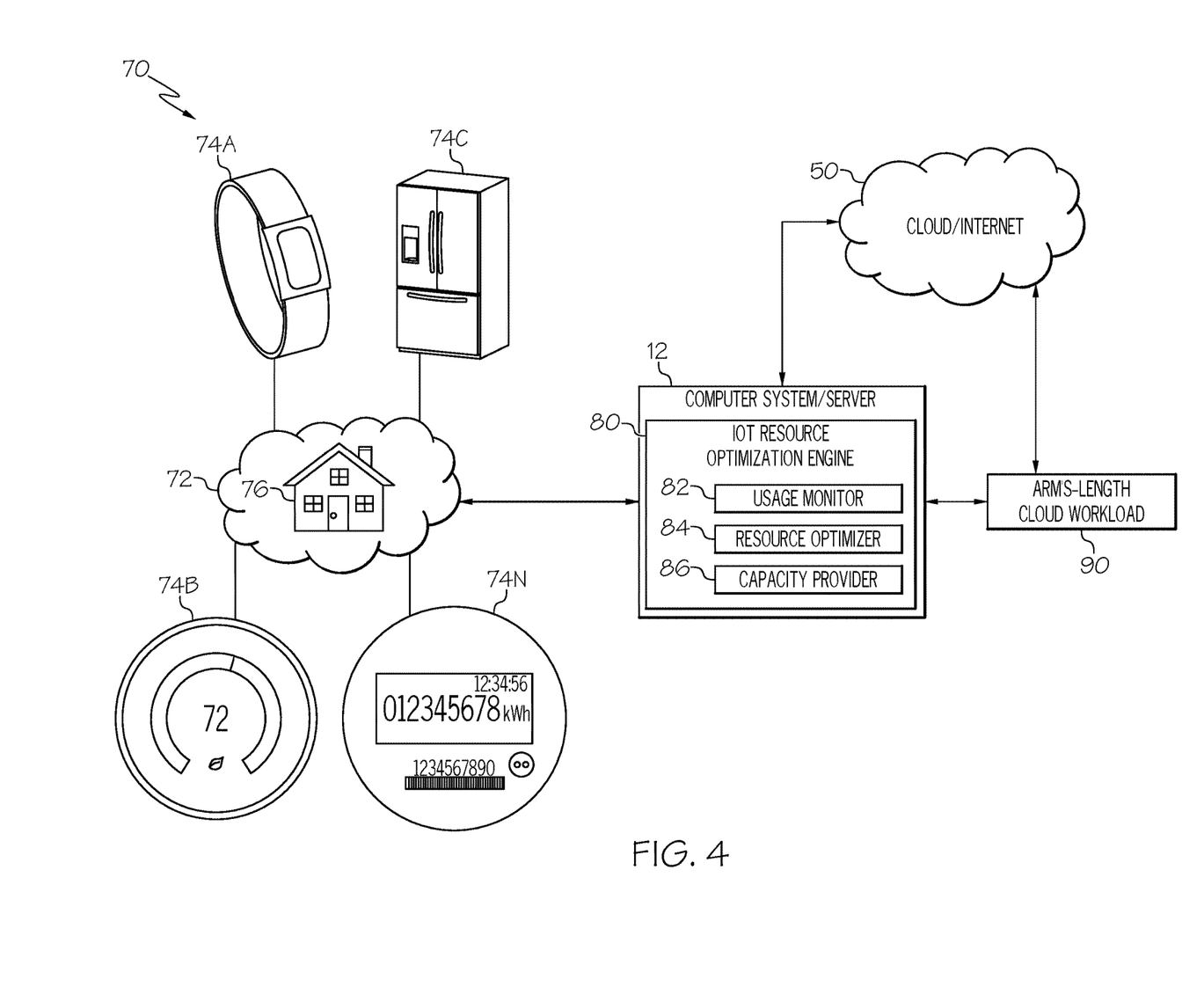
FIG. 4 shows an Internet of Things (IoT) environment and a system diagram describing the functionality discussed herein according to illustrative embodiments.

Referring now to FIG. 4, an illustrative internet of things (IoT) environment 70 is depicted. IoT environment 70 includes internet of things (IoT) network 72 formed by IoT devices 74A-N. IoT devices 74A-N may include one or more ambient devices, electronic recorders, electronic actuators, personal electronics, consumables, wearables, appliances, metering devices, and the like (such as devices 74A-N associated with home 76). Devices 74A-N may include, for example, personal electronic 74A (e.g., wearable device, etc.), system control device 74B (e.g., smart thermostat, smart plug, smart lock, smart light bulb, etc.), smart appliance 74C (e.g., a smart refrigerator/dishwasher/washing machine, a smart car/lawnmower, etc.), and/or smart meter 74N (e.g., a water/electric/gas meter). It is understood that the types of devices 74A-N shown in FIG. 4 are intended to be illustrative only and should not be interpreted as limiting. Although not discussed in detail here, IoT devices 74A-N can include, but are not limited to, any of the following: televisions, thermostats, smoke/CO2 detectors, lighting (e.g. HUE), white ware (e.g., washer, dryer), kitchen appliances (e.g., stove, microwave, refrigerator, dishwasher), security systems (e.g., cameras, motion sensors), sprinkler system controllers, locks (e.g., garage door, smart deadbolts), kitchen devices (e.g., coffee maker, toaster), portable devices (e.g., cameras), wearables, vehicles (e.g., cars, boats, etc.), automated blinds, air distribution devices (e.g., attic fan, automated vents, relative humidity sensors, dehumidifier, automated window openers), water distribution devices (e.g., leak detection, automated shut off valves), and exercise equipment (e.g., bikes, stair stepper). It should also be understood that devices 74A-N of IoT network 72 can communicate with various types of computerized systems and/or servers 12 over any type of network and/or network addressable connection 78, such as a PAN, WSAN, WLAN, or WAN, hardwired connection, and/or the like.

Devices 74A-N may be configured to control any activity, event, condition, or situation associated with home 76. For example, system control device 74B may be a smart thermostat configured to control the temperature of home 76 and, further, be configured to maintain the temperature of home 76 at various temperatures depending on a time of day or time of year. In another case, system control device 74B may be a smart light bulb configured to turn on or dim in response to detected motion or lack thereof. In another example, smart appliance 74C may be a smart dishwashing machine configured to perform a dish washing cycle when a drawer of the machine reaches a threshold fullness. In still another example, smart appliance 74C may be a smart refrigerator configured to transmit an alert when a food contained therein expires.

Devices 74A-N may additionally or in the alternative track, record, and/or store data associated with home 76. Tracked data associated with home 76 includes, but is not limited to, data monitored by devices 74A-N that describe any activity, event, condition, or situation of home 76. This tracked data may also be monitored to show dynamic changes over a period of time. For example, smart meter 74N can be configured to record usage of a utility (e.g., electric, water, or gas) by home 76 throughout the day. In another example, a resident of home 76 may use personal electronic 74A (e.g., a smart phone with a camera) to take and store a digital photograph. In still another example, personal electronic 74A may be a smart TV, configured to monitor programs that various residents of home 76 watch.

The inventors of the present invention have found that, while increasingly more IoT devices and other smart devices are being found in homes, these devices are not always in use and/or are used in a manner that is, as a whole, inefficient. This problem is compounded as smart devices become increasingly specialized to perform specific tasks traditionally performed manually by residents of the home, such as detecting if a product inside a refrigerator has expired and adding a replacement product to a digital shopping list or automatically vacuuming a room in response to a detected condition of the room. As a result, in a single home, a group of IoT devices may be each performing its own tasks at the same time, each drawing power and placing demands on the wireless network capacity associated with the home. These devices may then be forced to work in competition with one another for the network capacity, thereby drawing more power while performing less efficiently as compared to a single device or human being performing all tasks of the group. Furthermore, even when not in use, many IoT devices and smart devices are placed in a standby or ready mode, which requires the device to be powered on, further inefficiently consuming power resources.

Accordingly, the inventors of the present invention have developed a system that transfers tasks performed across a plurality of IoT devices to fewer IoT devices, thereby reducing the number or resources needed to complete these tasks. The system developed by the inventors of the present invention can further be configured to perform tasks from an arm's-length party (e.g., in exchange for compensation), thereby more efficiently using standby processing capacity (e.g., CPU, memory, network) and storage resources of a not currently in use IoT device. Furthermore, embodiments of the present invention offer several advantages for optimizing a plurality of resources connected within an IoT network. For example, embodiments of the present invention permit fewer IoT resources to be consumed per IoT device task. Also, embodiments of the present invention can maximize a quantity of performed tasks for a given consumption of resources and electrical power. Furthermore, embodiments of the present invention permit IoT devices, which would normally be wasting power and resources in a non-beneficial standby mode, to be utilized to perform beneficial tasks. Moreover, embodiments of the present invention enable devices in an IoT network to self-coordinate, thereby providing an optimized benefit to a user.

Referring again to FIG. 4, a system diagram describing the functionality discussed herein according to an embodiment of the present invention is shown. It is understood that the teachings recited herein may be practiced within any type of computing environment, including, but not limited to, a networked computing environment (e.g., cloud computing environment 50). A stand-alone computer system/server 12 is shown in FIG. 4 for illustrative purposes only. In the event the teachings recited herein are practiced in a networked computing environment, each client need not have an IoT resource optimization engine 80 (hereinafter "system 80"). Rather, all or part of system 80 could be loaded on a server or server-capable device that communicates (e.g., wirelessly) with the clients to provide for optimizing a plurality of resources connected within an IoT network. Regardless, as depicted, system 80 is shown within computer system/server 12. In general, system 80 can be implemented as program/utility 40 on computer system 12 of FIG. 1 and can enable the functions recited herein.

Along these lines, system 70 may perform multiple functions similar to a general-purpose computer. Specifically, among other functions, system 80 can optimize a plurality of resources connected within an IoT network in a networked computing environment. To accomplish this, system 80 can include a set of components (e.g., program modules 42 of FIG. 1) for carrying out embodiments of the present invention. These components can include, but are not limited to, usage monitor 82, resource optimizer 84, and capacity provider 86.

Through computer system/server 12, system 80 can be in communication with and interact with cloud computing environment 50 or any other networked computing environment (e.g., the Internet). Through cloud computing environment 50, arm's-length cloud workload 90 can be selected for assignment to one or more resources on Internet of Things (IoT) network 72. Arm's-length cloud workload 90 is a workload that a user of cloud computing environment 50 requests that cloud-computing environment 50 fulfill using resources of cloud computing environment 50. This user of cloud computing environment 50 is not a resident of home 76. In some embodiments, computer system/server 12 can be an in-network IoT device connected and in communication with IoT network 72. In some other embodiments, computer system/server 12 can be a component of cloud computing environment 50 and connected remotely to IoT network 72. Regardless, system 80 of computer system/server 12 is configured to connect (e.g., by a virtual private network (VPN)) arm's-length cloud workload 90 and IoT network 72.

Usage monitor 82 of system 80, as performed by computer system/server 12, can track usage of resources of IoT devices 74A-N connected within IoT network 72. The usage tracked by usage monitor 82 includes tasks performed on the resources and associated times at which the tasks are performed. The resources of IoT devices 74A-N can include, but are not limited to, storage resources (e.g., hard drive, memory cards) and processing resources (e.g., CPU, memory, network). For example, usage monitor 82 can track the storage and processing activity of system control device 74B and determine that 25% of the available storage space on the storage resource of system control device 74B is currently in use, that, at most, 30% of the storage space is ever in use, and that, therefore, 70% of the storage space on the storage resource of system control device 74B is never used. Furthermore, usage monitor 82 can determine that 35% of the CPU processing capacity of the processing resource of system control device 74B is currently in use, that during peak mid-day hours at most 55% of the processing capacity is ever in use, and that, therefore, 45% of the processing capacity on the processing resource of system control device 74B is never used and that up to 65% of the processing capacity on the processing resource of system control device 74B is available during off-peak hours, In some embodiments, usage monitor 82 can create a federated data store of some or all monitored usage activity in a master data management (MDM) repository. This MDM can separately store usage data for each IoT device 74A-N or even each processing or storage resource of IoT devices 74A-N. The federated data can be stored anywhere, such as within IoT network 72 (e.g., across one or more devices of IoT network 72) and/or in a storage area of cloud computing environment 50.

By monitoring/tracking usage of resources of IoT devices 74A-N connected within IoT network 72, usage monitor 82 can develop usage profiles of each device 74A-N and/or each resource of each IoT device 74A-N. These usage profiles can map average or typical usage of IoT devices 74A-N and/or resources of IoT devices 74A-N for a given cycle of time, such as daily, weekly, or monthly. The usage profiles can indicate peak demand periods (and/or off-peak demand periods) for IoT devices 74A-N and/or resources of IoT devices 74A-N within the time cycle. For example, the usage profile of system control device 74B may indicate that the controlled system consumes the most processing power between 11 am and 4 pm. In any case, usage monitor 82 can determine usage patterns that indicate when, in a given cycle of time, devices 74A-N are expected to most and to least consume their available resources.

In some embodiments of the present invention, usage monitor 82 can detect aberrant behavioral usage of resource and/or device 74A-N as compared to the typical resource usage pattern established in that particular device and/or resource's usage profile. Usage monitor 82 can be configured, automatically (e.g., based on a mathematical formula) or manually (e.g., by a user), with a threshold deviation tolerance for all or some resources, where any deviation above or below that tolerance triggers a non-normal usage alert. In some of these embodiments, usage monitor 82 can be configured to perform an action in response to a non-normal usage alert. This action can include, but is not limited to, turning off the particular device of IoT devices 74A-N that triggered the alert, stopping/preventing access to/usage of the particular resource that triggered the alert, and/or notifying a user of the device and/or a household resident of the non-normal usage alert. This notification can be, for example, in the form of an electronic notification, such as an email or SMS message, or an indicator sensible to one or more residents of home 76, such as an auditory (e.g., beeping sound) or visual (e.g., blinking light) indicator.

According to embodiments of the present invention, usage monitor 82 can further map two or more usage profiles of IoT devices 74A-N and/or resources of devices 74A-N against one another. This mapping permits usage monitor 82 to discover, during a cycle, times when IoT devices 74A-N have excess resources available, as well as the quantity of available resources. Furthermore, this mapping permits usage monitor 82 to identify times during the cycle when the resources of one device may be in demand, but complementary resources (i.e., resources capable of performing the same tasks as the demanded resource) of another device have little to no demand. As such, usage monitor 82 can map all resource activity within IoT network 72 for a complete time cycle of IoT network 72.

Resource optimizer 84 of system 80, as performed by computer system/server 12, can identify anticipated tasks at anticipated times and anticipated available capacities at substantially the same anticipated times based on the tracked usage of resources. To accomplish this, resource optimizer 84 can analyze the usage map of some or all resource activity within IoT network 72 developed by usage monitor 82 from resource usage profiles of IoT devices 74A-N and/or resources of IoT devices 74A-N. Resource optimizer 84 can be configured to recognize resource optimization opportunities based on the mapping. For example, resource optimizer 84 can determine that at peak hours in the middle of each day, 30% of the storage space and 55% of the processing capacity of system control device 74B is in use, and that during this period, only 5% of the storage space and 7% of the processing capacity of smart appliance 74C is in use.

Resource optimizer 84 of system 80, as performed by computer system/server 12, can further generate excess capacity on a first resource by transferring an anticipated task from the first resource to a second resource at a time corresponding with the anticipated task. To accomplish this, resource optimizer 84 can route tasks normally performed on one IoT device to another IoT device. For example, resource optimizer 84 can transfer items stored in the storage space of IoT device 74C to the storage space of IoT device 74B and can transfer processing tasks from the processing component of IoT device 74C to the processing component of IoT device 74B. In some embodiments, this can be accomplished by scheduling micro services to run one or more workloads from a first device on one or more second devices. This leaves one or more resources of IoT device 74C free. Accordingly, IoT device 74C is optimized by, for example, permitting IoT device 74C to be placed into a low power state that saves energy, used for backup storage/processing, or offered for the performance of other tasks, which will be discussed in more detail further below.

In some embodiments, the transfer of tasks from one IoT device to another IoT device can use a publish-subscribe based messaging protocol such as Message Queue Telemetry Transport (MQTT) to send data from one IoT device 74A-N to another IoT device 74A-N in IoT network 72. In such an embodiment, resource optimizer 84 can use a message broker, such as Eclipse Mosquitto, to implement the MQTT protocol. Additionally or alternatively, IBM's Watson IoT platform on Bluemix can be used as an MQTT server. It should be understood, however, that embodiments of the present invention are not limited to Bluemix and/or MQTT and, as such, embodiments of the present invention can use any protocol presently known or later developed to send and receive data to and from IoT devices 74A-N. All trademarks and trade names used herein are the property of their respective owners and are used for illustrative and descriptive purposes only.

In some embodiments, resource optimizer 84 can leverage available storage resources on one or more IoT devices as a backup data store. For example, photos taken on a camera device or camera phone can be backed up on one or more IoT devices 74A-N, such as smart appliance 74C, where traditionally such photos would not be stored.

In some embodiments, resource optimizer 84 of system 80 can be configured to schedule a task on an IoT device 74A-N that is related to a task that is anticipated to be performed or that is presently being performed on a particular other IoT device 74A-N. In some embodiments, this scheduling can be based on the map resource or IoT device usage. Furthermore, the scheduling of a task on a related IoT device 74A-N can be in response to a data reading from another IoT device 74A-N. For example, resource optimizer 84 can sense the brightness or lack thereof on a smart TV IoT device and dim a set of smart light bulb IoT devices in response. In another example, resource optimizer 84 can detect that the smart TV IoT device is in use and, in response, decrease background noises made by other IoT devices. Other examples include, but are not limited to: changing a smart sprinkler system watering schedule in response to detected rain, or opening automated windows in the case that an outside temperature is more desirable than an inside temperature and/or a detected pollen or pollution count is low.

Figure 5:
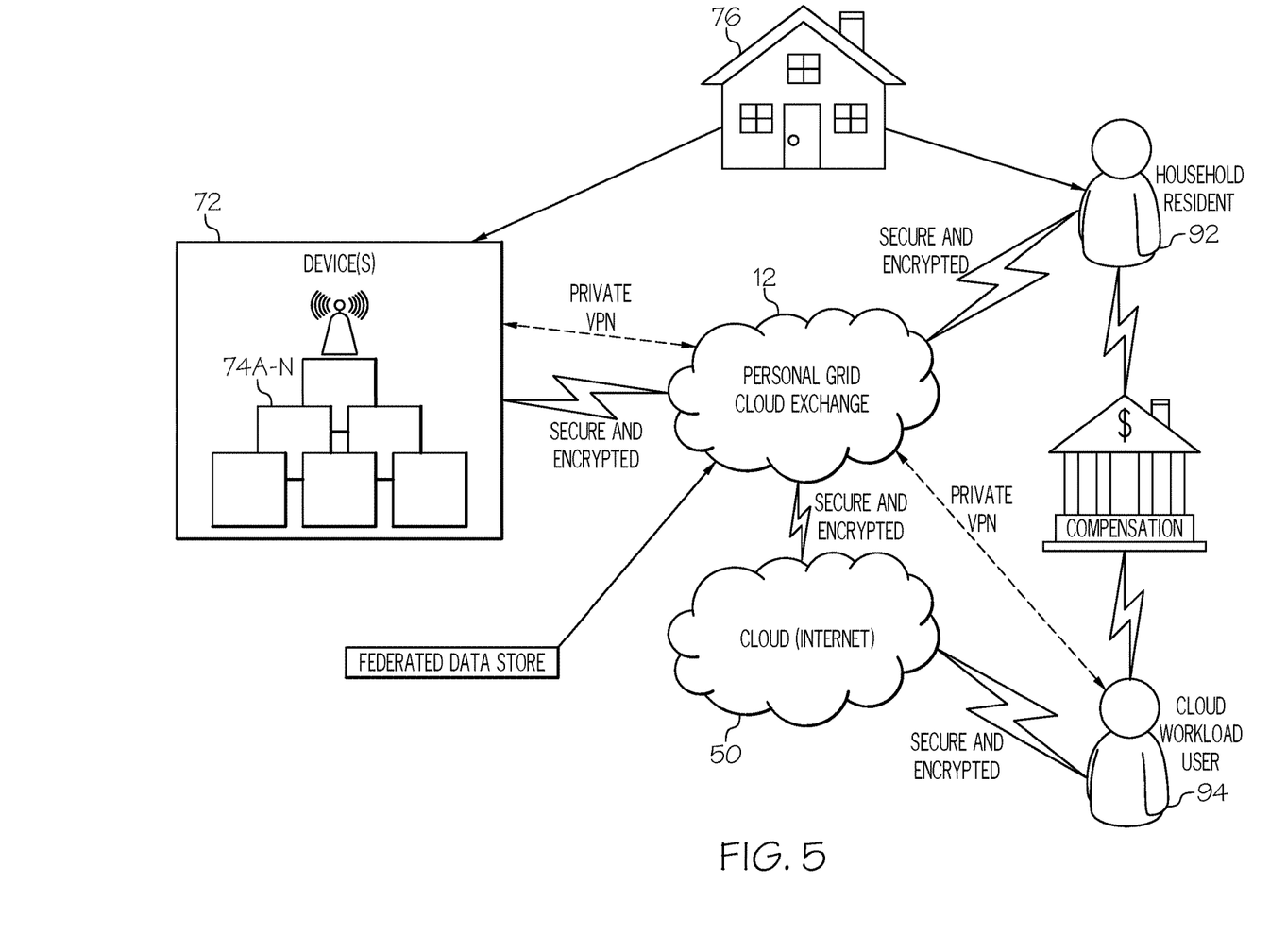
FIG. 5 shows an example implementation of the present invention according to illustrative embodiments.

Referring now to FIG. 5 in addition to FIG. 4, an illustrative example of an implementation of an embodiment of the present invention is shown. Capacity provider 86 of system 80, as performed by computer system/server 12, can designate the excess capacity generated on an IoT resource at an anticipated time for use by an arm's-length party and assign a load from the arm's-length party to the excess capacity of the IoT resource. To accomplish this, capacity provider 86 can configure one or more IoT devices 74A-N with a cloud computing resource broker to provide a portion of the spare/excess storage/processing capacity of those one or more IoT devices 74A-N. In some embodiments, the cloud computing resource broker is a component of capacity provider 86, while in some other embodiments, the cloud computing resource broker is a component of cloud computing environment 500.

Capacity provider 86 can, via the cloud computing resource broker in some embodiments, configure access to the spare/excess storage/processing capacity of one or more IoT devices 74A-N from cloud computing environment 50. This access can be via a private and secure means, such as a gateway VPN mechanism. In response to cloud workload user 94 requesting resources on which to run a workload from the cloud computing resource broker, capacity provider 86 can grant cloud workload user 94 access to the spare/excess storage/processing capacity of the one or more IoT devices 74A-N, for example, via the VPN mechanism. It should be understood that cloud workload user 94 is an arm's-length user of cloud computing environment 50 and has no association with household resident 92 of home 76. Capacity provider 86 can then permit a workload of cloud workload user 94 to run or otherwise use the spare storage or processing capacity of the available one or more IoT devices 74A-N. From the perspective of cloud workload user 94, their workload seamlessly appears to be using a resource of cloud computing environment 50.

In some embodiments, capacity provider 86 can provide this spare/excess storage/processing capacity to the cloud computing resource broker in exchange for a rate of monetary compensation or some other form of compensation. As such, capacity provider 86 and/or the cloud computing resource broker can monitor and/or log (e.g., at regular intervals) the usage of the spare storage or processing capacity of IoT devices 74A-N for the purpose of determining a quantity of compensation to which household resident 92 is entitled in exchange for the device usage. In some embodiments, capacity provider 86 and/or the cloud computing resource broker can receive compensation (e.g., payment) from cloud workload user 94 and distribute the compensation to household resident 92.

In some embodiments, capacity provider 86 can package one or more resources of IoT devices 74A-N as a single offering for use by cloud workload user 94. For example, excess processing capacity of IoT device 74B for a one-hour block can be paid with excess storage capacity of IoT device 74C for a three-hour block. It should be understood that the packaged resources can be from the same or different devices of IoT network 72, can be the same or different types of resources, can be offered for any timeframe, and can be of any number. In some embodiments, capacity provider 86 can determine which resources to package together as an offering based on the mapping of usage profiles of devices 74A-N by usage monitor 82 and optimization/concentration of active resources by resource optimizer 84.

In some embodiments, capacity provider 86 can be configured to permit household resident 92 to select a quantity or percentage of available excess/spare capacity or a timeframe within which such excess/spare capacity is available to offer to arm's-length parties through the cloud computing resource broker. In some further embodiments, capacity provider 86 can be configured to receive a compensation offer from cloud workload user 94 in exchange for use of the IoT resource spare capacity and to permit household resident 92 to accept or reject the offer at the proposed rate of compensation. In some embodiments, capacity provider 86 can present household resident 92 with an interface (e.g., an omnichannel interface) that permits household resident 92 to compare compensation offers before selecting an arm's-length party to permit to purchase the excess capacity.

According to some embodiments of the present invention, capacity provider 86 of system 80, as performed by computer system/server 12, can additionally or in the alternative provide the arm's-length party with tracked usage data from one or more IoT devices 74A-N of IoT network 72. In these embodiments, capacity provider 86 can determine contextually a type of data (e.g., IoT device usage data, IoT device capacity data) and a classification of data (e.g., viewing statistics from a smart TV, heating/cooling profile from a smart thermostat, exercise data from a wearable device) stored in each federated section of the MDM repository. This data can be anonymized so that household resident 92 is not identifiable through the data. Capacity provider 86 can also determine if two or more sets of data are related to one another and/or should be packaged together to maximize a potential value of the data based on the classified type of data. For example, exercise data from a wearable IoT device, weight loss data from a smart scale, and food consumption data from a smart refrigerator have a high likelihood of being related/correlated.

Capacity provider 86 can further determine types of parties that may be interested in the packaged data based on the contextually determined type or classification of the data (e.g., insurance and medical companies for exercise/weight loss/food data). Non-limiting examples of parties that capacity provider 86 may identify in response to particular classes or types of data are listed in the following chart.

| Data Source | Contextual Type/ Classification | Potentially Interested Parties |
| --- | --- | --- |
| Televisions | Viewing statistics | Viewing data companies (e.g., Neilson) |
| Thermostats | Temperature, Heating/ Cooling profile | Heating/Cooling companies |
| Smoke/CO2 detectors | Battery life, occurrences of false alarms | Insurance companies |
| Lighting | Usage pattern (dusk to dawn, night lighting), | Home owners insurance, lighting companies |
| White ware | Usage information by type | Appliance manufactures |
| Kitchen appliances | Preference information, usage | Appliance manufactures |
| Security system | Outside video data which monitors traffic patterns | Security companies, law enforcement agencies, home owners insurance |
| Sprinkler system | Usage patterns, regulatory requirements | Municipalities, Water companies |
| Locks | Vendor arrival and service times | Insurance companies |
| Kitchen devices | Usage data | Marketing companies |
| Portable devices | Pictures | Stock picture sellers |
| Wearables | Exercise data | Insurance and medical companies |
| Vehicles | Usage information, locations visited, traffic patterns, driving habits | Car companies, car rental agencies, insurance companies |
| Automated blinds | Waking/sleeping routine | Security companies, weather companies |
| Air distribution | HVAC efficiency | Heating and cooling companies |
| Water distribution | Leaks, capture rates | Water companies, insurance companies |
| Exercise equipment | Usage statistics | Insurance and medical companies |

Capacity provider 86 can contact a party identified as potentially interested and offer one or more classes of anonymized data in exchange for compensation. In these embodiments, capacity provider 86 is configured to provide household resident 92 with a catalog of the federated data stored in the MDM repository and to receive a selection from household resident 92 as to which data capacity provider 86 is permitted to offer for compensation. Once capacity provider 86 has found a potential buyer, capacity provider 86 can be configured to request authorization from household resident 92 to proceed with the exchange of data for compensation.

Figure 6:
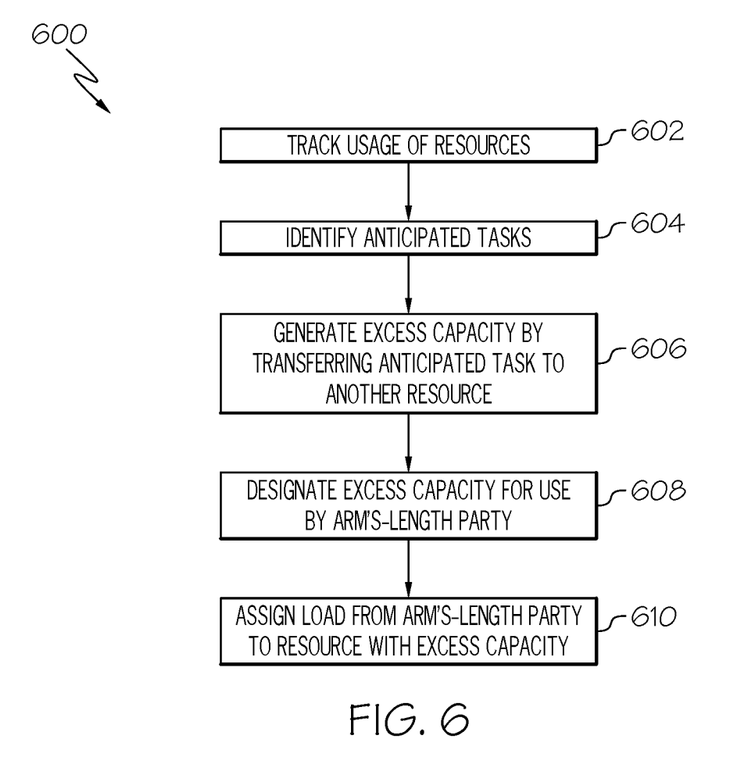
FIG. 6 shows a process flowchart for optimizing a plurality of resources connected within an IoT network according to illustrative embodiments.

As depicted in FIG. 6, in one embodiment, a system (e.g., computer system 12) carries out the methodologies disclosed herein. Shown is a process flowchart 600 for optimizing a plurality of resources connected within an IoT network. At step 602, usage of a first resource and usage of a second resource of the plurality of resources connected within the IoT network is tracked, the usage of the first resource comprising a first task and a time at which the first task is performed and the usage of the second resource comprising a second task and a time at which the second task is performed. At 604, an anticipated first task at an anticipated time is identified based on the tracked usage of the first resource and an anticipated capacity at substantially the same anticipated time is identified on the second resource based on the tracked usage of the second resource. At 606, excess capacity is generated on the first resource by transferring the anticipated first task to the second resource for the anticipated time. At 608, the excess capacity of the first resource at the anticipated time is designated for use by an arm's-length party. At 610, a load from the arm's-length party is assigned to the excess capacity of the first resource.

Process flowchart 600 of FIG. 6 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing a plurality of resources connected within an IoT network. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for optimizing a plurality of resources connected within an IoT network. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to optimize a plurality of resources connected within an IoT network. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing a plurality of resources connected within an Internet of Things (loT) network, the method comprising:

tracking usage of a first resource and usage of a second resource of the plurality of resources connected within the IoT network, the usage of the first resource comprising a first task and a time at which the first task is performed and the usage of the second resource comprising a second task and a time at which the second task is performed;

identifying an anticipated first task at an anticipated time based on the tracked usage of the first resource and identifying an anticipated capacity at substantially the same anticipated time on the second resource based on the tracked usage of the second resource, wherein the anticipated first task comprises a workload that causes an event in the physical world related to the second task;

generating excess capacity on the first resource by transferring the workload of the anticipated first task to the second resource for the anticipated time;

designating the excess capacity of the first resource at the anticipated time for use by an arm's-length party;

assigning a load from the arm's-length party to the excess capacity of the first resource.

2. The method of claim 1, the method further comprising:

generating a resource usage profile for each of the first resource and the second resource;

mapping, for a time period, the first task and the time at which the first task is performed and the second task and the time at which the second task is performed; and predicting the anticipated first task and the anticipated capacity based on the mapping.

3. The method of claim 2, the method further comprising:

detecting a variance outside of a predetermined threshold in the usage profile of the first or second resource;

disabling the first or second resource responsive to the variance; and generating a notification responsive to the variance.

4. The method of claim 2, the method further comprising scheduling a task for performance by a third resource during the time period based on the mapping of the first task and the time at which the first task is performed or the mapping of the second task and the time at which the second task is performed.

5. The method of claim 1, the method further comprising:
identifying contextually a classification of data generated by one or more devices connected within the IoT network;
determining an interest of the arm's-length party in the generated data based on the classification;
offering the generated data as a package to the arm's-length party in response to an authorization; and
providing the arm's-length party with the generated data.

6. The method of claim 1, the method further comprising:
establishing a virtual private network (VPN) connection between the first resource and the arm's-length party;
monitoring usage by the arm's-length party of the first resource;
and receiving compensation from the arm's-length party for the monitored use of the first resource.

7. The method of claim 1, wherein the first resource and the second resource are each a component of two separate devices connected to the IoT network, both the first and second resources being selected from the group consisting of: storage resources and processing resources.

8. A computer system for optimizing a plurality of resources connected within an Internet of Things (loT) network, the computer system comprising:
a memory medium comprising program instructions;
a bus coupled to the memory medium; and
a processor, for executing the program instructions, coupled to an IoT resource optimization engine via the bus that when executing the program instructions causes the system to:
track usage of a first resource and usage of a second resource of the plurality of resources connected within the IoT network, the usage of the first resource comprising a first task and a time at which the first task is performed and the usage of the second resource comprising a second task and a time at which the second task is performed;
identify an anticipated first task at an anticipated time based on the tracked usage of the first resource and identify an anticipated capacity at substantially the same anticipated time on the second resource based on the tracked usage of the second resource, wherein the anticipated first task comprises a workload that causes an event in the physical world related to the second task;
generate excess capacity on the first resource by transferring the workload of the anticipated first task to the second resource for the anticipated time;
designate the excess capacity of the first resource at the anticipated time for use by an arm's-length party;
assign a load from the arm's-length party to the excess capacity of the first resource.

9. The computer system of claim 8, the instructions further causing the system to:
generate a resource usage profile for each of the first resource and the second resource;
map, for a time period, the first task and the time at which the first task is performed and the second task and the time at which the second task is performed; and
predict the anticipated first task and the anticipated capacity based on the mapping.

10. The computer system of claim 9, the instructions further causing the system to:
detect a variance outside of a predetermined threshold in the usage profile of the first or second resource;
disable the first or second resource responsive to the variance; and
generate a notification responsive to the variance.

11. The computer system of claim 9, the instructions further causing the system to schedule a task for performance by a third resource during the time period based on the mapping of the first task and the time at which the first task is performed or the mapping of the second task and the time at which the second task is performed.

12. The computer system of claim 8, the instructions further causing the system to:
identify contextually a classification of data generated by one or more devices connected within the IoT network;
determine an interest of the arm's-length party in the generated data based on the classification;
offer the generated data as a package to the arm's-length party in response to an authorization; and
provide the arm's-length party with the generated data.

13. The computer system of claim 8, the instructions further causing the system to: establish a virtual private network (VPN) connection between the first resource and the arm's-length party; monitor usage by the arm's-length party of the first resource; and receive compensation from the arm's-length party for the monitored use of the first resource.

14. The computer system of claim 8, wherein the first resource and the second resource are each a component of two separate devices connected to the IoT network, both the first and second resources being selected from the group consisting of: storage resources and processing resources.

15. A computer program product for optimizing a plurality of resources connected within an Internet of Things (loT) network, the computer program product comprising a computer readable hardware storage device, and program instructions stored on the computer readable hardware storage device, to:
track usage of a first resource and usage of a second resource of the plurality of resources connected within the IoT network, the usage of the first resource comprising a first task and a time at which the first task is performed and the usage of the second resource comprising a second task and a time at which the second task is performed;
identify an anticipated first task at an anticipated time based on the tracked usage of the first resource and identify an anticipated capacity at substantially the same anticipated time on the second resource based on the tracked usage of the second resource, wherein the anticipated first task comprises a workload that causes an event in the physical world related to the second task;
generate excess capacity on the first resource by transferring the workload of the anticipated first task to the second resource for the anticipated time;
designate the excess capacity of the first resource at the anticipated time for use by an arm's-length party;
assign a load from the arm's-length party to the excess capacity of the first resource.

16. The computer program product of claim 15, the computer readable storage device further comprising instructions to:
generate a resource usage profile for each of the first resource and the second resource;

map, for a time period, the first task and the time at which the first task is performed and the second task and the time at which the second task is performed; and predict the anticipated first task and the anticipated capacity based on the mapping.

17. The computer program product of claim 16, the computer readable storage device further comprising instructions to:

detect a variance outside of a predetermined threshold in the usage profile of the first or second resource;

disable the first or second resource responsive to the variance; and generate a notification responsive to the variance.

18. The computer program product of claim 16, the computer readable storage device further comprising instructions to schedule a task for performance by a third resource during the time period based on the mapping of the first task and the time at which the first task is performed or the mapping of the second task and the time at which the second task is performed.

19. The computer program product of claim 15, the computer readable storage device further comprising instructions to:

identify contextually a classification of data generated by one or more devices connected within the IoT network;

determine an interest of the arm's-length party in the generated data based on the classification;

offer the generated data as a package to the arm's-length party in response to an authorization; and provide the arm's-length party with the generated data.

20. The computer program product of claim 15, the computer readable storage device further comprising instructions to: establish a virtual private network (VP N) connection between the first resource and the arm's-length party; monitor usage by the arm's-length party of the first resource; and receive compensation from the arm's-length party for the monitored use of the first resource.

\* \* \* \* \*